United States Patent [19]
Ayanoglu et al.

[11] Patent Number: 5,119,196
[45] Date of Patent: Jun. 2, 1992

[54] GHOST CANCELLATION OF ANALOG TV SIGNALS

[75] Inventors: Ender Ayanoglu, Atlantic Highlands, N.J.; Israel Bar-David, Haifa, Israel; Richard D. Gitlin, Little Silver, N.J.; Chih-Lin I, Red Bank, N.J.; Jack H. Winters, Middletown, N.J.

[73] Assignee: AT&T Bell Laboratories, Murray Hill, N.J.

[21] Appl. No.: 542,612

[22] Filed: Jun. 25, 1990

[51] Int. Cl.⁵ .............................................. H04N 5/21
[52] U.S. Cl. .................................... 358/167; 358/36; 358/187; 358/905
[58] Field of Search ................. 358/166, 167, 905, 36, 358/37, 340, 187

[56] References Cited

U.S. PATENT DOCUMENTS

| | | | |
|---|---|---|---|
| 4,359,778 | 11/1982 | Lee | 358/167 |
| 4,367,489 | 1/1983 | Holmes | 358/167 |
| 4,371,266 | 2/1983 | Holmes | 358/167 |
| 4,413,282 | 11/1983 | Wargo | 358/167 |
| 4,502,077 | 2/1985 | Morotomi et al. | 358/167 |
| 4,559,450 | 12/1985 | Murata et al. | 358/167 |
| 4,564,862 | 1/1986 | Cohen | 358/167 |
| 4,586,083 | 4/1986 | Kuroyanagi | 358/167 |
| 4,698,680 | 10/1987 | Lewis, Jr. et al. | 358/166 |
| 4,727,424 | 2/1988 | Chao | 358/167 |
| 4,864,403 | 9/1989 | Chao et al. | 358/167 |
| 4,941,049 | 7/1990 | Citta | 358/187 |
| 5,047,859 | 9/1991 | Koo | 358/187 |

OTHER PUBLICATIONS

B. Widrow, "Adaptive Filters", Aspects of Network and System Theory, R. Kalman, N. DeClaris (eds.), New York, Holt, Rinehart, and Winston, 1970, pp. 563–587.
W. Ciciora, et al., "A Tutorial on Ghost Cancellation in Television Systems," IEEE Trans. on Consumer Electronics, vol. CE-25, Feb. 1979, pp. 9–44.
D. J. Harasty & A. Oppenheim, "Television Signal Deghosting by Noncausal Recursive Filtering", Proc. of the 1988 Int. Conf. on Acoustics, Speech, and Signal Processing, New York City, N.Y., Apr. 11–14, 1988, pp. 1778–1781.
R. T. Compton, Jr., "Adaptive Antennas: Concepts and Performance," Prentice-Hall, Inc., New Jersey, 1988, pp. 326–332.
"Extended Definition Television (EDTV)", 1989 National Association of Broadcasters Guide to Advanced Television Systems, Washington, D.C., p. 54.

Primary Examiner—Tommy P. Chin
Attorney, Agent, or Firm—B. H. Freedman

[57] ABSTRACT

Ghosts are canceled in received analog TV (for IDTV, EDTV, and HDTV) signals by utilizing the fact that there are short periods of time without the analog signals (the horizontal flyback interval between the lines) to process the received signal on a line-to-line basis using a finite impulse response (FIR) or an infinite impulse response (IIR) equalizer. This line-by-line processing (which can be implemented by periodic cleansing of the equalizer) overcomes the limitations of standard equalizers to allow for 40–50 dB of suppression of ghosts, even with nulls in the spectrum, as long as the ghost delay is less than the period of time without the analog signal. Furthermore, by using time inversion in combination with line-by-line processing, the stability problem of the conventional IIR equalizer is eliminated. The IIR equalizer may be implemented on a single digital integrated circuit. Alternatively, an FIR equalizer can be used which, although it may require multiple chips (i.e., more taps), can acquire and adapt to the ghosted channel more rapidly than an IIR equalizer. With line-by-line processing, FIR and IIR equalizers can eliminate any ghost with delays up to 11 μsec in IDTV or EDTV. For larger delays, a standard IIR or FIR equalizer can be used as a preprocessor to eliminate small ghosts and an adaptive antenna can be used to eliminate large ghosts. Thus, with these techniques, the ghosting problem can be eliminated in all TV receivers.

22 Claims, 7 Drawing Sheets

GHOST CANCELLATION OF ANALOG TV SIGNALS

TECHNICAL FIELD

This invention relates generally to processing of television signals and, in particular, to ghost cancellation in analog TV signals.

BACKGROUND OF THE INVENTION

Multipath propagation is a significant source of picture quality degradation in television transmission. The ghosts in the received TV image can be a serious problem with NTSC signals and will be an even more important problem with new modes of television broadcasting and receiving such as Improved Definition TV (IDTV), Extended Definition TV (EDTV), and High Definition TV (HDTV) where these ghosts must be removed to realize the full quality improvement.

Numerous techniques have been studied for the elimination of ghosts in TV images. A good review is contained in a paper by W. Ciciora, et al., entitled "A Tutorial on Ghost Cancellation in Television Systems", IEEE Trans. on Consumer Electronics, Vol. CE-25, February 1979, pp. 9–44. For example, deghosting circuitry is commercially available (in Japan) for EDTV that can achieve from 20 to 30 dB of ghost suppression for ghosts up to 6 dB below the main signal level, as described in the 1989 National Association of Broadcasters Guide to Advanced Television Systems, Washington, D.C., p. 54. However, all previously reported techniques are limited in the magnitude or type of ghosts that can be adequately suppressed with analog signals. In particular, all these techniques fail when there is a null in the channel spectrum. Specifically, with a null, a finite impulse response (FIR) equalizer cannot adequately suppress the ghosts, while an infinite impulse response (IIR) equalizer greatly enhances the noise in the picture. Such a null occurs with a single ghost (reflection) with the same magnitude as the desired signal (e.g., with a nonabsorbing reflector such as most buildings). A null can also occur with multiple ghosts even when they are weaker than the desired signal. Therefore, nulls in the channel spectrum (i.e., zeros in the z-domain that approach the unit circle) are a problem for many TV receivers. Unfortunately, it is difficult for any particular TV user to determine the location of the zeros of the channel from the ghosted picture, so that he or she can obtain an appropriate filter. Thus, not only do current techniques fail to adequately suppress ghosts in many cases, but the user may have to purchase and test the deghosting electronics at home in order to determine if it will work properly.

SUMMARY OF THE INVENTION

In accordance with the present invention, ghosts are eliminated in a received analog TV Signal in all of the cases described above, by performing independent line-by-line FIR or IIR equalization on the "active" portion of the signal, thus utilizing the fact that the television signal includes short "inactive" periods of time (i.e., the horizontal flyback interval between the lines) with no unknown analog signals, only deterministic signals. In the preferred embodiment, line-by-line processing is implemented by periodically cleansing (zeroing all the samples in) the equalizer. This line-by-line processing eliminates the ghost suppression problem of a finite length FIR equalizer, because the ghosts can be shifted outside the line, and reduces the noise enhancement for the IIR equalizer. Thus line-by-line processing overcomes the limitations of conventional FIR and IIR equalizers to allow for 40–50 dB of suppression of ghosts, even with nulls in the spectrum—as long as the ghost delay is less than the period of time without the analog signal (e.g., the horizontal flyback interval for NTSC signals). The IIR equalizer may be implemented on one or more digital integrated circuits, or, alternatively, an FIR equalizer can be used. In the latter case, although more (or more complex) chips may be required, the FIR arrangement can acquire and adapt to the ghosted channel more rapidly than an IIR equalizer.

The present invention can eliminate any ghost with delays up to 11.2 $\mu$sec (the horizontal flyback interval in NTSC) for IDTV or EDTV (or the period without nondeterministic signals in HDTV). For ghosts with larger delays, a conventional IIR or FIR equalizer can be used as a preprocessor to eliminate the small ghosts, and adaptive antennas can be used to eliminate the large ghosts. With respect to present NTSC signals, our invention can suppress all ghosts 20–30 dB below the main signal (IDTV). With better reference signals transmitted with NTSC (as in some EDTV proposals), suppression of all ghosts to 40–50 dB is possible. For HDTV, our invention can be used to suppress the ghosts to 40–50 dB in the analog portion of the HDTV (i.e., hybrid analog/digital) signal, or in multilevel digital signals where conventional equalization techniques for digital signals (e.g., decision-feedback equalization (DFE)) are not effective because the error rate is too high. In these HDTV systems, the maximum delay for suppression of ghosts of any magnitude by line-by-line processing depends on the length of the interval without nondeterministic signals between each line. This interval can be increased to completely eliminate the ghosting problem in the analog signal of HDTV systems.

BRIEF DESCRIPTION OF THE DRAWING

The present invention will be better appreciated by consideration of the following detailed description, when read in light of the accompanying drawing in which.

DETAILED DESCRIPTION

Before describing how the present invention eliminates ghosts using line by line processing, it will be instructive to first consider the fundamental limits of ghost reduction techniques with continuous-time, analog signals.

Figure 1:
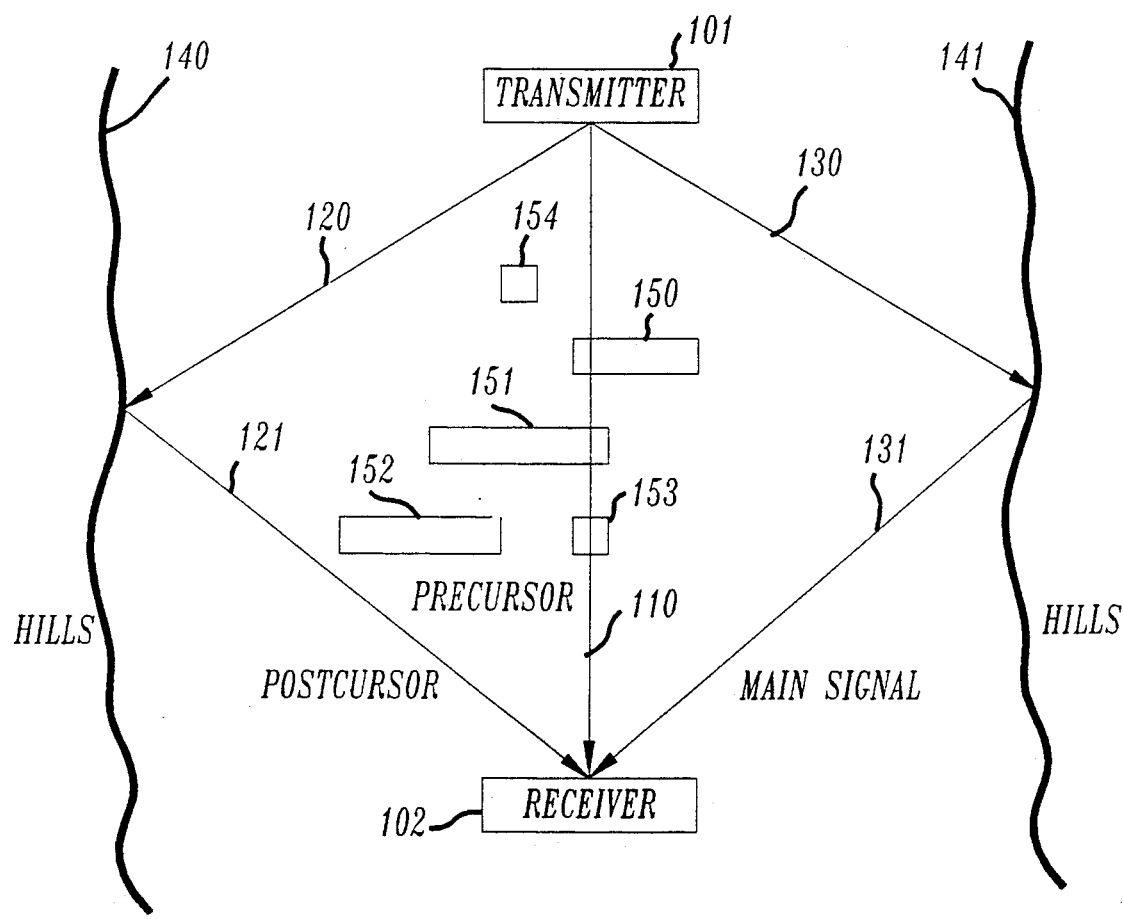
FIG. 1 diagrammatically illustrates a ghosting scenario where both precursor and postcursor ghosts are present.

For NTSC signals (i.e., for IDTV and EDTV), as well as for HDTV in the U.S. (where NTSC compatibility is required), the channel bandwidth is 6 MHz, although the analog video signal occupies only about 4.15 MHz. The analog NTSC signal is a vestigial sideband (VSB) modulated signal. We consider two types of transmission with multipath propagation: cable and air. Multipath propagation in cable is caused by reflections from connectors, discontinuities, etc., in the cable. With such reflections, the first signal received is the strongest, followed by much weaker signals (ghosts). These ghosts are referred to as postcursor ghosts and can usually be eliminated by simple, conventional ghost cancellation techniques, such as FIR equalization. In air transmission, ghosts are caused by reflections from buildings, trees, mountains, etc. If a line-of-sight exists between the transmit and receive antennas, then only postcursor ghosts will be present, although these ghosts may have signal levels approaching that of the main signal. If such a line-of-sight does not exist, then the strongest signal may arrive after the attenuated direct signal and these ghosts are called precursor ghosts; postcursor ghosts may also be present. Such a situation is depicted in FIG. 1. In that figure, a television signal emanating from transmitter 101 is received at receiver 102 via three paths. The main (strongest) signal arrives via two path legs 130 and 131, which reflect from nearby hills 141. A postcursor signal arrives later (with greater delay), also via two path legs 120 and 121, which reflect from more distant hills 140. A precursor signal arrives via an obstructed line of sight path 110 between transmitter 101 and receiver 102, blocked by the presence of some of the city buildings 150-154 and therefore is weaker than the main signal. Sometimes it is difficult to determine which is the strongest signal and this signal may itself be distorted, since it can be a reflected signal.

Generally, ghosts must be suppressed such that they are 40-50 dB below the main signal in order that they are not noticeable, while noise, because it is random, can be 10 dB higher than this before it is noticeable.

The delay between the ghost and the main signal is given by the difference in path lengths, or $$\tau = 1/c. \tag{1}$$

where l is the difference in path lengths between the two signals and c is the speed of light ($3 \times 10^8$ m/sec). For example, an 11.2 μsec delay corresponds to a 3.3 km path length difference, i.e., reflection from an object at least 1.6 km away. For the NTSC signal, the signal is transmitted in frames, one frame every 1/30 sec, with 525 lines per frame. The line duration is 63.5 μsec with 11.2 μsec for the horizontal flyback interval. During this 11.2 μsec interval, the analog signal is not transmitted, i.e., only deterministic signals are present. This will be used to our advantage implementing the present invention. Also, during the vertical blanking interval of 1.27 msec, which occurs twice per frame (once per field), the analog signals is not transmitted.

With multipath propagation, the channel impulse response h(t) is in general a continuous function of time. However, if we are only interested in reflectors that generate ghosts above some threshold, then we may be able to model the channel as a sum of I discrete reflectors $$h_c(t) = \sum_{i=1}^{I} a_i \delta(t - \tau_i). \tag{2}$$

where $a_i$ and $\tau_i$ are the amplitude and delay of the reflectors, and $\delta(t)$ is the Dirac delta function. The reflectors are usually distributed reflectors such as mountains and buildings, which limit the accuracy of the model. However, since the signal is bandlimited, we can always use a discrete channel model $$h(t) = \sum_{i=1}^{J} b_i \delta(t - iT) \tag{3}$$

where the samples are taken at the Nyquist rate, $T = \frac{1}{2} f_s$ and $f_s$ is the signal bandwidth. Unfortunately, since we have analog signals, even with only one reflector, an accurate discrete channel model may require many samples J.

Let us now consider the fundamental limits on ghost suppression of continuous analog signals. Ghost suppression at the receiver can be accomplished by passing the receiver signal through an equalizer with a transfer function that is the inverse of the channel. Exact inversion of the channel modeled by equation (3) can be obtained by an Infinite Impulse Response (IIR) equalizer, while an approximate channel inverse can be achieved by a Finite Impulse Response (FIR) equalizer. Below we determine the fundamental limits and advantages of these two equalizer architectures.

Figure 2:
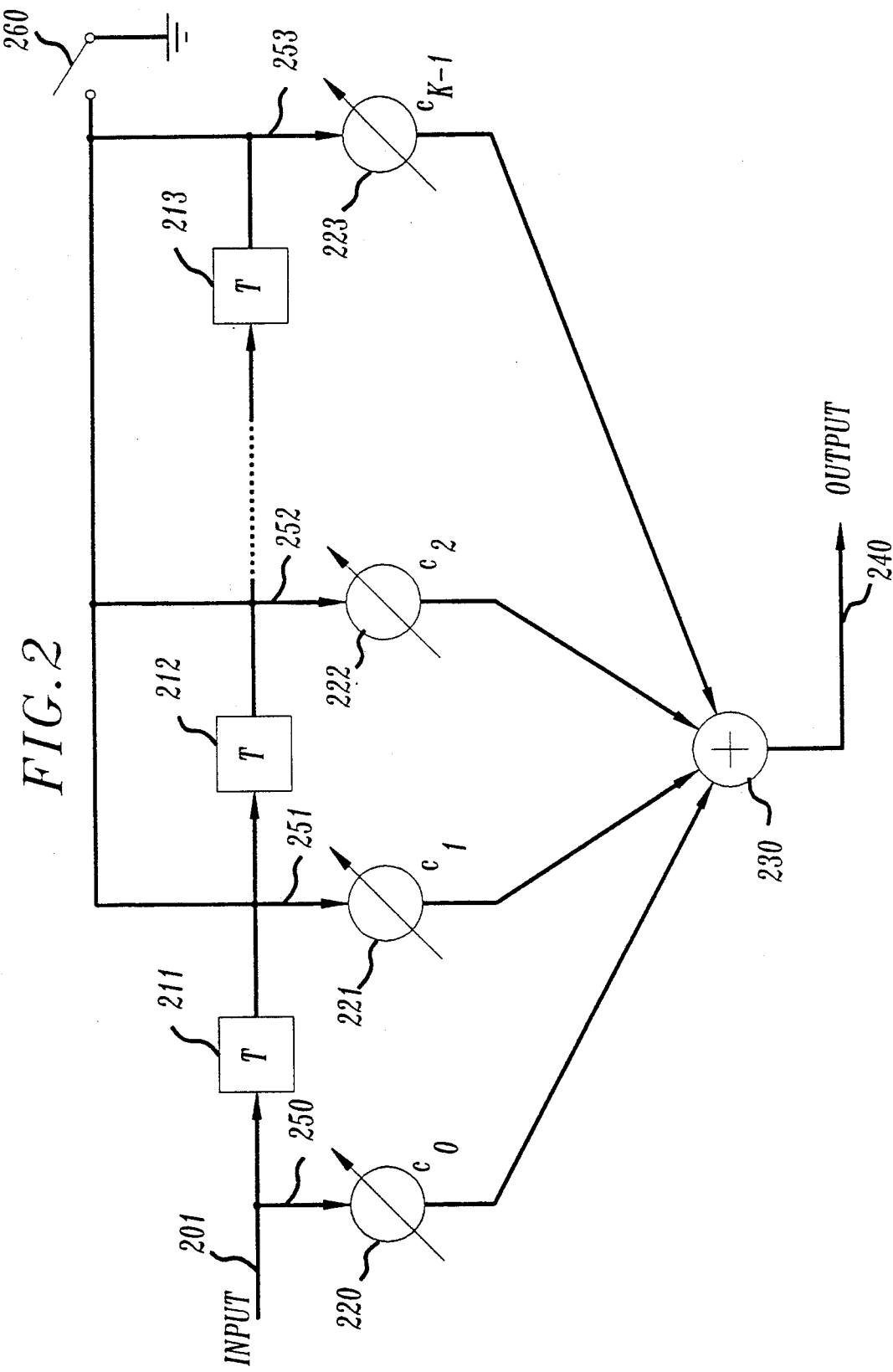
FIG. 2 is a block diagram of a tapped delay line equalizer (FIR filter) with K taps.

FIG. 2 shows a block diagram of an FIR equalizer comprising a tapped delay line (FIR) equalizer with K taps with tap weights or coefficients $c_i$, $i=0, \ldots, K-1$. The input signal on line 201 is applied to the first of K−1 series connected delay elements 211-213, each of which provides a delayed sample of the signal being processed to one input (251-253) of K−1 corresponding multipliers 221-223, and directly to a multiplier 220. Each of the K multipliers receives as a second input a tap weight or coefficient $c_i$, and the outputs of the multipliers are combined in an adder 230 to form the filter output on line 240. The delay between taps is $T = \frac{1}{2} f_s$, although $T < \frac{1}{2} f_s$ can also be used. Let us first consider the number of taps required to suppress a single ghost with a given input desired-to-undesired (i.e., main signal to ghost signal) signal power ratio $(D/U)_{in}$, delay $\tau$, and output desired-to-undesired signal ratio $(D/U)_{out}$. In this case, we represent the channel impulse response as $$h(t) = \delta(t) + \frac{1}{\sqrt{(D/U)_{in}}} \delta(t - \tau). \tag{4}$$

Consider the sample case where the ghost delay is a known integer multiple of the tap delay, $\tau = kT$.

To cancel the ghost, the tapped delay line attempts to invert the channel. From equation (4), the inverse of the frequency response of the channel has the time response (i.e., $h^{-1}(t)$ is the inverse Fourier transform of the channel inverse frequency response)

$$h^{-1}(t) = \tag{5}$$

$$\text{fourier}^{-1}\left\{ \left[ \text{fourier}\left( \delta(t) + \frac{1}{\sqrt{(D/U)_{in}}} \delta(t - kT) \right) \right]^{-1} \right\}$$

-continued $$h(t) = \delta(t) + \sum_{i=1}^{\infty} (-\sqrt{(D/U)_{in}})^{-i} \delta(t - ikT). \quad (6)$$

where "fourier" denotes the Fourier transform. By truncating the infinite series in equation (6), we have $$h_{FIR}(t) = \delta(t) + \sum_{i=1}^{M-1} (-\sqrt{(D/U)_{in}})^{-i} \delta(t - ikT), \quad (7)$$

i.e., the tap weights for the FIR equalizer are $$c_o = 1 \quad (8)$$

$$c_{ik} = (-\sqrt{(D/U)_{in}})^{-i}, i = 1, \ldots, M-1. \quad (9)$$

$$c_j = 0, j \neq ik, i = 1, \ldots, M-1, \quad (10)$$

where the total number of taps in the equalizer is $K = k(M-1) + 1$. The output pulse (channel convolved with equalizer) response is $$h(t)*h_{FIR}(t) = \delta(t) + (-\sqrt{(D/U)_{in}})^{-M} \delta(t - MkT), \quad (11)$$

where the asterisk "*" denotes convolution. Thus, after equalization the ghost is at $t = MkT$ with $(D/U)_{out} = (-D/U)_{in}^M$, implying that $M = \log(D/U)_{out}/\log(D/U)_{in}$. In other words, $$\frac{\log(D/U)_{out}}{\log(D/U)_{in}}$$

nonzero taps are required, spaced at kT, to suppress a single ghost. For example, if $(D/U)_{in} = 5$ dB, then 10 taps are required for $(D/U)_{out} = 50$ dB. Thus, to suppress any single ghost with an unknown delay of any multiple of T up to kT, $$k \left( \frac{\log(D/U)_{out}}{\log(D/U)_{in}} - 1 \right) + 1$$

taps are required (although only M taps are active, i.e., have nonzero weights, with a single ghost). For example, to suppress any single ghost with $(D/U)_{in} < 5$ dB and $\tau < 11.2$ μsec to $(D/U)_{out} > 50$ dB requires 1212 taps (with $f_s = 6$ MHz, $T = 83.3$ nsec).

However, the ghosts may not always have delays that are integer multiples of T. Our analysis has shown that for $\tau \neq kT$, up to N additional taps may be required around each of the taps required for a ghost at kT, where $$N \leq ((D/U)_{out})^{\frac{1}{6}}. \quad (12)$$

Thus, for $(D/U)_{out} = 50$ dB, $N \leq 7$, and, to cancel a single ghost with $D/U_{in} = 5$ dB, up to $7 \cdot 10 = 70$ (active) taps may be required. Thus, all 1212 taps may have to be used with only 18 ghosts.

The main point to note, however, is that to suppress a ghost to a given $(D/U)_{out}$, the required number of taps (length of the FIR equalizer) grows with the level of the single ghost. For $(D/U)_{out} = 50$ dB and $\tau = 11.2$ μsec, 2168 taps are required for $(D/U)_{in} = 3$ dB, 6596 taps are required for $(D/U)_{in} = 1$ dB, and the number of taps approaches infinity as the ghost level approaches the desired signal level. Alternatively, for a fixed number of taps (as would be present with a given implementation), the ghost suppression decreases with ghost level (i.e., $(D/U)_{out} = (D/U)_{in}^M$). For example, with 1212 taps, $(D/U)_{out} = 30$ dB with $(D/U)_{in} = 3$ dB, and $(D/U)_{out} = 10$ dB with $(D/U)_{in} = 1$ dB, and the level of suppression approaches zero as the ghost level approaches the desired signal level.

Finally, consider the multiple ghost case. Here, we simply note that the FIR equalizer requires an increasing number of taps as one or more of the zeros of $H(z) = \text{zet}\{h_k\}$, where zet denotes the z-transform and $h_k = h(kT)$, approach the unit circle. With multiple ghosts, it has been shown by D. J. Harasty and A. V. Oppenheim in their paper "Television Signal Deghosting by Noncausal Recursive Filtering", Proc. of the 1988 International Conference on Acoustics, Speech, and Signal Processing, New York City, N.Y., Apr. 11-14, 1988, p. 1778-1781 that the zeros of H(z) can approach the unit circle if $\Sigma a_i$ approaches (or exceeds) the desired signal level, where the $a_i$'s are the ghost amplitudes from equation (2). Thus, a fixed length FIR equalizer may not be able to adequately suppress ghosts even if the individual ghosts have powers several dB below the desired signal power.

Figure 3:
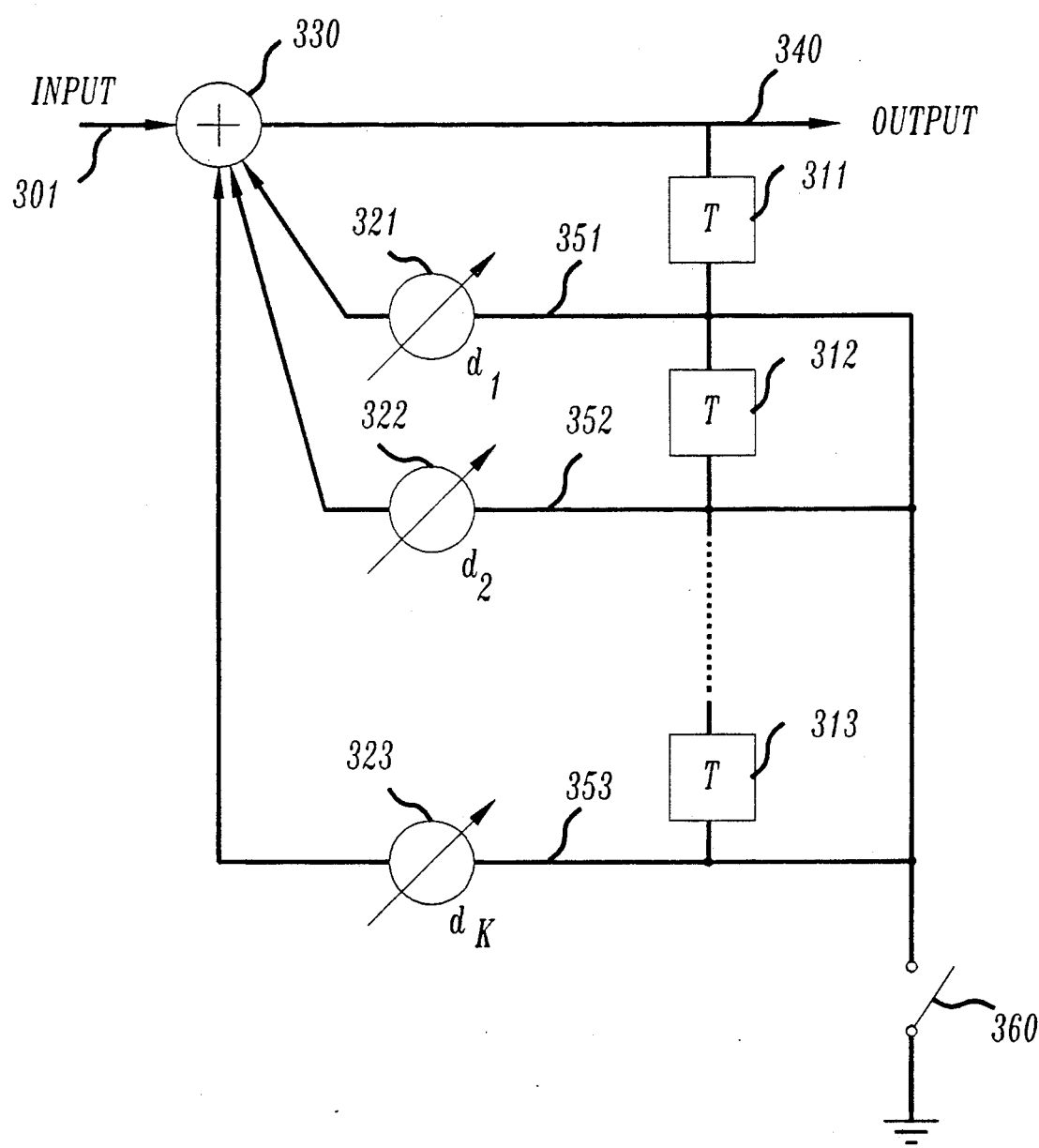
FIG. 3 is a block diagram of a feedback tapped delay line equalizer (IIR filter) with K taps.

The situation with respect to an infinite impulse response (IIR) equalizer can be understood by now referring to FIG. 3, which shows an IIR equalizer comprising a feedback tapped delay line with K taps with tap weights $d_i$, $i = 1, \ldots, K$. The delay line consists of K series connected delay elements 311-313, the first of which receives its input from the equalizer output on line 340. The outputs 351-353 of each delay element 311-313, provide first inputs to one of K corresponding multipliers 321-323, each of which receives as a second input a coefficient $d_i$. The outputs of the multipliers are combined with each other and with the input signal on line 301, in an adder 330, the output of which is the equalizer output on line 340. The delay between taps is $T = \frac{1}{2} f_s$, as before. Again, first consider a single ghost with the channel impulse response of equation (4). For a single ghost of any magnitude and with a delay of $\tau = kT$, channel inversion by the equalizer requires only one tap, independent of $(D/U)_{in}$ and $(D/U)_{out}$. Specifically, from equation (6), $$h_{IIR}(t) = \delta(t) + \sum_{i=1}^{\infty} (-\sqrt{(D/U)_{in}})^{-i} \delta(t - ikT), \quad (13)$$

i.e., the tap weights or coefficients for the IIR equalizer are $$d_k = (-\sqrt{(D/U)_{in}})^{-1} \quad (14)$$

$$d_j = 0 \, j \neq k.$$

Note that $(D/U)_{out} = \infty$, i.e., the ghost is completely canceled.

With $\tau \neq kT$ as in the FIR equalizer case, the number of taps required per ghost is given by equation (12), i.e., up to 7 taps may be required to suppress a single ghost to $(D/U)_{out} = 50$ dB.

Note that the required number of taps for a given $(D/U)_{out}$ with the IIR equalizer does not increase with the ghost level, as with the FIR equalizer. Specifically, a K-tap IIR equalizer can always suppress, to a given $(D/U)_{out}$, any ghost (assuming $(D/U)_{out} \geq 1$ and $\tau > 0$, i.e., a weaker postcursor ghost) with $\tau < (K - (-D/U)_{out}^{1/6})T$, where $(D/U)_{out}^{1/6}T$ is subtracted because up to $(D/U)_{out}^{1/6}$ taps are required when $\tau \neq kT$. For example, to suppress any ghosts within 11.2 μsec, only 142 taps are required. However, although an IIR equalizer has the advantage over an FIR equalizer that it can always adequately suppress a ghost with a fixed number of taps, it has the disadvantages of greater noise enhancement and stability problems, as described below.

The noise enhancement of the equalizer is the ratio of the output noise power $N_{out}$ to the input noise power $N_{in}$. For the FIR filter, with tap weights $c_i$, $i = 0, \ldots, M-1$, and, assuming independent noise samples which are added to the channel output, $$\frac{N_{out}}{N_{in}} = 1 + \sum_{i=1}^{M-1} c_i^2. \quad (15)$$

For the IIR filter, the noise enhancement is a more complicated function of the feedback tap weights. However, the IIR filter can also be modeled as an FIR filter with an infinite number of taps. Thus, for the IIR equalizer, $$\frac{N_{out}}{N_{in}} = 1 + \sum_{i=1}^{\infty} c_i^2. \quad (16)$$

where the $c_i$ are the impulse response coefficients of the IIR filter (i.e., the coefficients for the equivalent FIR equalizer). From equations (15) and (16), we see that for the same ghosted channel, the noise enhancement of the IIR equalizer is greater than that of the FIR by $$\sum_{i=M}^{\infty} c_i^2.$$

For example, with a single ghost at $(D/U)_{in}$, $$c_i = (- \sqrt{(D/U)_{in}})^{-i},$$

and for the (worst) case of $\tau = T$, $$\frac{N_{out}}{N_{in}} = \begin{cases} \dfrac{1 - (D/U)_{in}^{-M}}{1 - (D/U)_{in}^{-1}} & FIR, \\ \dfrac{1}{1 - (D/U)_{in}^{-1}} & IIR. \end{cases} \quad (17)$$

Thus, for the FIR with 1212 taps (and the IIR with 142 taps), the noise enhancement for $(D/U)_{in} = 6, 3$, and 1 dB is 3, 5, and 10 dB, respectively, for both the FIR and IIR. However, as $(D/U)_{in}$ approaches 0, the noise enhancement of the IIR approaches infinity, while that of the FIR approaches 31 dB (with 1212 taps). Of course, with an FIR equalizer, the ghost suppression will not be adequate long before noise enhancement is a problem, and, thus, noise enhancement is not a concern. However, with an IIR equalizer, noise enhancement limits the maximum ghost level for which adequate picture quality can be obtained with equalization.

Another problem is the stability of the IIR equalizer. With a single ghost, the IIR equalizer is stable only with postcursor ghosts. This type of equalizer is unstable with precursor ghosts, i.e., when the delayed signal is stronger than the first signal. Note that this is not a problem with an FIR equalizer, which, because it uses a feedforward architecture, is always stable. Specifically, the IIR equalizer is unstable when the zeros of the z-transform of the channel response are outside the unit circle. Note also that as the zeros approach the unit circle, noise enhancement degrades the picture quality.

With multiple ghosts, the performance of the IIR equalizer depends on the location of zeros (as with the single ghost case). Again, as the zeros approach the unit circle, noise enhancement degrades the picture quality, and the equalizer is unstable for zeros outside the unit circle, which, as discussed for the FIR equalizer, can occur even when the ghosts are several dB below the desired level signal (even without precursor ghosts).

Figure 4:
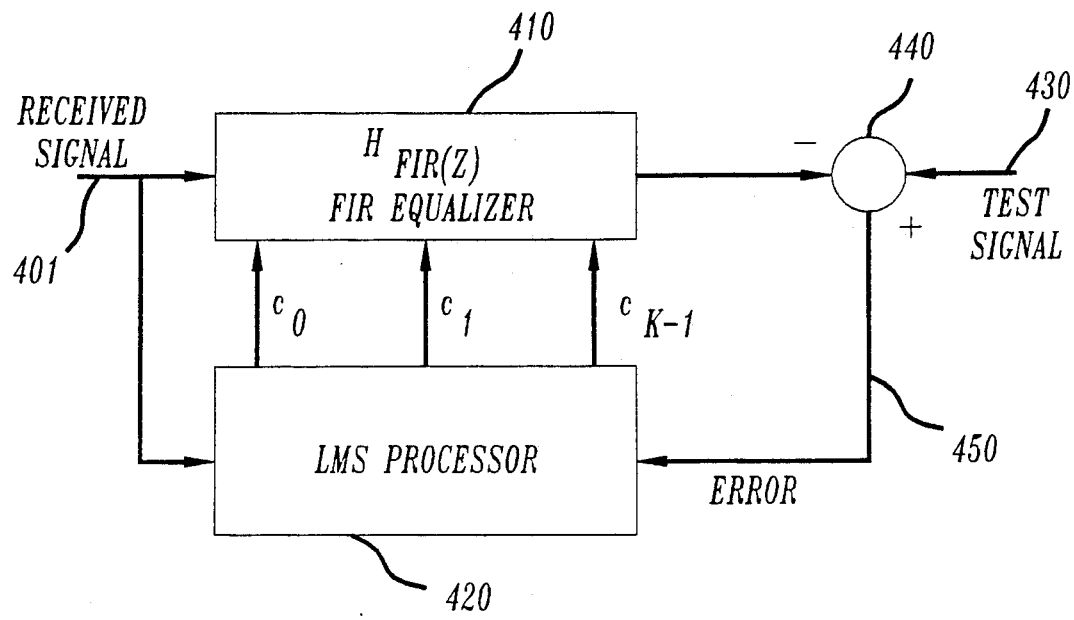
FIG. 4 is a block diagram of the weight adaptation for an FIR equalizer.

For the FIR equalizer of FIG. 2, adaptation of the tap weights (i.e., coefficients $c_0$-$c_{K-1}$) to realize the channel inverse can be accomplished using the the least mean squares (LMS) algorithm described by B. Widrow in "Adaptive Filters", Aspects of Network and System Theory, R. E. Kalman and N. De Claris (eds.), New York, Holt, Rinehart, and Winston, 1970, pp. 563–587 in conjunction with a suitable reference signal, such as a vertical or horizontal interval test signal. As shown in FIG. 4, the received signal on line 401 is applied to FIR equalizer 410, which may be arranged as shown in FIG. 2, and to an LMS processor 420, which as described below, computes the values of the K coefficients $c_0$-$c_{K-1}$ which are input to the multipliers in equalizer 410. The output of equalizer 410 is compared to a test signal applied on line 430, in a subtractor 440, and the error line 450 is applied to LMS processor 420. Computations within processor 420 are performed as explained, for example, in the above cited Widrow's paper. By adjusting the coefficients recursively, the output of equalizer 410 is driven toward the test signal on line 430, with each cycle reducing the error between the two signals. In general, convergence to an accuracy of 40-50 dB requires the number of iterations on the order of 10 times the number of taps, or 10K. Thus, with one iteration per line (i.e., using the horizontal interval test signal), the convergence time is 635K μsec, or 0.76 sec with 1212 taps.

Figure 5:
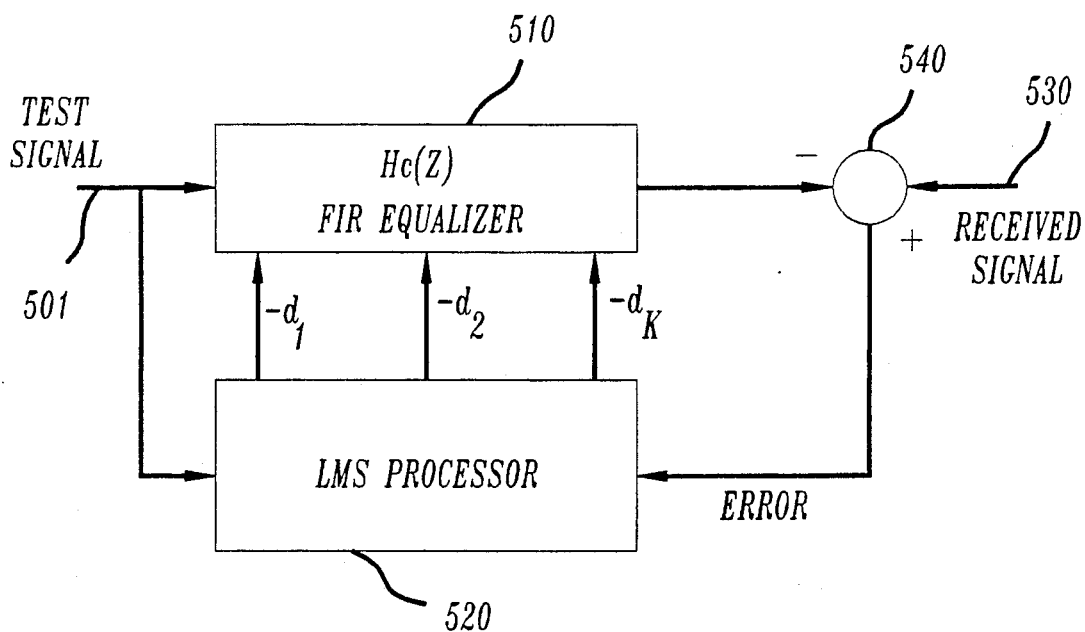
FIG. 5 is a block diagram of the weight adaptation for an IIR equalizer.

For the IIR equalizer, adaptation of the weights can be carried out in a similar manner as that for the FIR equalizer, as shown in FIG. 5, with the significant difference that the filter weights estimate the channel (not the channel inverse) and the negative of these weights are copied into the IIR equalizer shown in FIG. 3. Thus, for the IIR equalizer, the reference signal on line 501 is applied to FIR filter 510 and the received signal on line 530 is compared with the output of FIR filter 510 in subtractor 540 to yield the error signal input to LMS processor 520. In this arrangement, FIR filter 510 tries to approximate the channel $H_c(z)$, (rather than $H_{FIR}(z)$, trying to approximate the inverse model $1/H(z)$ for the FIR equalizer of FIG. 4). For the IIR equalizer, the channel is inverted by the feedback transfer function $1/H(z)$. Thus, the weights in the IIR equalizer ($d_i$, $i = 1, \ldots, K$) are just the negative of the coefficients $b_i$ in the channel model equation (3).

If the maximum ghost delay is greater than 11.2 μsec, then the analog signal will interfere with the horizontal interval test signal, and an accurate channel model may be difficult to determine. In this case, the vertical interval test signal or other training signal can be used to generate the reference signal. However, the adaptation time is increased by a factor of the number of lines (i.e., 252 or 262.5, since there is a vertical blanking interval in each field), which may be unacceptable. In this case, the sample matrix inverse method described by R. T. Compton, Jr., in his book "Adaptive Antennas: Concepts and Performance", Prentice-Hall, Inc., New Jersey, 1988, pages 326-332, can be used to quickly generate the channel model, although more complicated processing is required.

Next, consider the required accuracy of the equalizer to keep the quantization noise below a given level. Since the quantization noise appears random rather than coherent as ghosts, an average TV viewer can tolerate a higher level of quantization noise—typically a noise level of 40 dB is not noticeable. For a K tap equalizer with n bits of accuracy in the tap weights, the signal-to-quantization-noise ratio S/N is $$S/N = \frac{2^{-2n}}{12} K. \tag{18}$$

Thus, for a 40-50 dB S/N and 1212 taps, 10-12 bits of accuracy are required, while for 142 taps, 9-11 bits of accuracy are required. Since most analog devices have only up to 8 bits of accuracy, digital representation and digital signal processing (i.e., digital chips) are required to obtain 40-50 dB signal-to-quantization noise ratio.

In summary, the presently available IIR equalizer arrangement has the advantage over the presently available FIR equalizer arrangement in that the IIR equalizer requires taps only over the interval of ghost delays to suppress from one up to an arbitrary number of ghosts, while the FIR equalizer requires an increasing number of taps as $(D/U)_{in}$ approaches 0 dB (i.e., as the zeros of the channel response approach the unit circle). Thus, the IIR equalizer has lower complexity, and thereby requires fewer or less complex integrated circuits. However, as $(D/U)_{in}$ approaches 0 dB, noise enhancement with the IIR equalizer may degrade picture quality. The FIR equalizer, on the other hand, has the advantage that it can operate even when the zeros are outside the unit circle (e.g., with precursor ghosts), while the conventional IIR equalizer is unstable in this case.

Thus, both the FIR and IIR equalizers have unsatisfactory performance (ghost suppression or noise enhancement) as the zeros of the channel transfer function approach the unit circle. As discussed earlier, this is undesirable since many TV receivers may have ghosts of this type that, therefore, cannot be canceled by the above techniques, yet the user could not determine whether the equalizer would work without testing it at home. For satisfactory performance, the ghost suppression of the FIR equalizer must be improved, the noise enhancement of the IIR equalizer must be reduced, and the IIR equalizer must be made stable, under all ghosting scenarios. Fortunately, the present invention achieves all of these objectives, as shown below.

In the previous analysis, it was assumed that the TV signal was a continuous analog signal. However, the NTSC TV signal has a dead time during the horizontal flyback interval when this analog signal is not transmitted. If the ghost duration is less than the horizontal flyback interval (11.2 μsec or a 3.3 km path length difference), we have recognized that there is no interference between lines of the analog signals (deterministic signals during the horizontal flyback interval cause known interference between lines which can be subtracted out, as discussed below) and line-by-line processing advantageously can be done. This eliminates the ghost suppression problem of the FIR equalizer (since the residual ghost appears outside the analog signal portion of the line), reduces noise enhancement in the IIR equalizer, and can be used to guarantee stability of the IIR equalizer, under all ghosting scenarios, as shown below. In short, line by line processing produces extremely desirable results.

In the following discussion, we restrict our attention to the case where the total ghost delay variation is less than the horizontal flyback interval. That is, the maximum precursor delay $\tau_{pre}$ plus the maximum postcursor delay $\tau_{post}$ is less than the horizontal flyback interval. In this case, all the information needed to determine a line is contained in the samples from $\tau_{pre}$ before to $\tau_{post}$ after the line, and no other analog (nondeterministic) signals are in these samples. Of course, any deterministic signals in the horizontal flyback interval are in these samples, but since these digital signals are known a priori (or their exact received level can easily be determined), they can be subtracted out. This is discussed in detail below.

In accordance with our invention, to deghost one line, we only need to use samples over that line (63.5 μsec or 763 samples for a 12 MHz sampling rate). Therefore, the FIR equalizer needs to have a maximum length of $2 \times 52.3 + 11.2 = 115.8$ μsec or 1398 taps to deghost the line. In practice, line-by-line processing can be achieved by operating the FIR equalizer continuously (as in the standard FIR equalizer), but setting the signals applied to multipliers 220-223 on lines 250-253 to zero (cleansing the equalizer) after the sample at $\tau_{post}$ past the end of the line has entered the equalizer and generated an output. For implementation of the FIR equalizer using a digital signal processor, the signals 250-253 can be set to zero in software, while in an anlog tapped delay line implementation (which generally would not have the accuracy needed to produce the desired level of ghost suppression) a switch 260 in FIG. 2 could simply ground the outputs of delay elements 211-213. Alternatively, the samples in each line can be processed in blocks by a digital signal processor. One characteristic of block processing is that samples from one line are processed independently of samples in other lines, and independently of outputs generated by samples in other lines. Although the equalizer has 1398 taps (i.e., stored tap weights), since there are only 763 samples per NTSC line, only a maximum of 763 taps are active at any one time. Also, the FIR equalizer needs to generate an output only for each sample in the output picture, i.e., 52.3/63.5 of each line. Thus, the FIR has an average processing rate of a $763 \times 52.3/63.5 = 628$ tap equalizer, which requires fewer (or less complex) integrated circuit chips to implement. Note also that with line-by-line processing in accordance with our teachings, as long as the total ghost delay spread is less than 11.2 μsec, the ghosts are completely eliminated, for any ghost magnitude or location of zeros.

However, with the ghosts eliminated, we must now be concerned with the noise enhancement of the FIR equalizer. With 763 samples, the noise enhancement of the FIR equalizer will, according to equation (15), at most be 29 dB. Of course, this only occurs when all the taps are of equal magnitude (one ghost with $(D/U)_{in} = 0$ dB and $\tau = T$), which is unlikely. In all other cases, the noise enhancement, as given by equation (15), will be less. Thus, with line-by-line processing as we propose, an FIR equalizer provides a good solution to the ghost cancellation problem, even though it requires more taps than an IIR equalizer.

For the IIR equalizer, line-by-line processing (which, as with the FIR equalizer, can be implemented by setting the signals applied to multipliers 321–323 on lines 351–353 to zero once per scan line as, for example, by closing switch 360) has the advantages that it reduces the noise enhancement and can be used to ensure stability. From the above discussion for the FIR equalizer, the reason for the reduction in noise enhancement should be clear. Since, with line-by-line processing, the IIR equalizer is cleansed at the end of each line, the noise enhancement is limited (for zeros inside the unit circle, i.e., a stable conventional IIR equalizer) to that of the FIR equalizer. This is because the IIR equalizer noise enhancement sum in equation (16) is truncated at $M-1$ (i.e., equation (15)) with line-by-line processing. Specifically, in the worst case, the noise enhancement is 29 dB rather than infinity.

With line-by-line processing, the IIR equalizer is, of course, always stable. However, with zeros outside the unit circle, the noise enhancement can easily be very large (and exceed 29 dB), and the signal levels in the equalizer can saturate the devices in any given implementation. To avoid these problems, we use spectral factorization, along with time inversion. Specifically, we first factor the channel response $H(z)$ into the product of two polynomials—one with zeros inside ($H^+(z)$) and one with zeros outside ($H^-(z)$) the unit circle. Then, if we pass the received signal through $$\frac{G^-(z)}{H^-(z)}$$

and pass the time-reversed received signal through $$\frac{G^-(z)}{H^-(z)},$$

such that $$\frac{G^+(z)}{H^+(z)} + \frac{G^-(z)}{H^-(z)} = 1/H(z),$$

we can equalize the channel with minimal noise enhancement, 29 dB noise enhancement in the worst case. Details of this technique will be appreciated from the following description which should be read in conjunction with FIG. 6.

Consider the simple case $H(z) = \alpha_1 + z^{-1}$, $0 < \alpha_1 < 1$. Let $X(z)$ be the z-transform of one transmitted block $\{x_0, x_1, \ldots, x_{L-1}\}$. We have the corrupted received signal with z-transform $$X(z)H(z) = (x_0 + x_1 z^{-1} + \ldots + x_{L-1} z^{-L+1})(\alpha_1 + z^{-1}) \quad (19)$$

$$= x_0 \alpha_1 + (x_0 + x_1 \alpha_1) z^{-1} + \ldots + x_{L-1} z^{-L} \quad (20)$$

from which we would like to extract $X(z)$. Processing $X(z)H(z)$ by $1/H(z)$ would have the desired effect, but $1/H(z)$ is an unstable filter. Although due to line-by-line processing, stability is not a problem for the actual signal (we only look at the output for one line), any noise in the received signal will be amplified and may corrupt the output. We can, however, observe that in convolving two time sequences the two sequences are moved in opposite directions to calculate the consecutive output values, from beginning to end. One could also start from the end of the output time sequence and move towards its beginning. To accomplish this, both the input and the filter sequences need to be time-reversed, convolved, and the output time-reversed again so that the beginning becomes the end and vice versa. For the example above, when we reverse the received signal in time, we obtain $$x_{L-1} + (x_{L-2} + x_{L-1}\alpha_1)z^{-1} + \ldots + x_0\alpha_1 z^{-L} \quad (21)$$

and process it by the time-reversed (and therefore stable) IIR filter $$\frac{1}{1 + \alpha_1 z^{-1}}. \quad (22)$$

It can easily be verified by long division that this process results in $$x_{L-1} + x_{L-2}z^{-1} + \ldots + x_0 z^{-L-1}, \quad (23)$$

which, when time-reversed, yields $$X(z) = x_0 + x_1 z^{-1} + \ldots + x_L z^{-L}. \quad (24)$$

In general, we have a channel filter $H(z)$ with zeros both inside and outside the unit circle. Let the total number of zeros of $H(z)$ be $N$. $H(z)$ can be factorized as $$H(z) = H^+(z)H^-(z) \quad (25)$$

such that $H^+(z)$ has all of its zeros inside the unit circle, and $H^-(z)$ has all of its zeros outside the unit circle. Then, $1/H(z)$ can be expanded as $$\frac{1}{H(z)} = \frac{G^+(z)}{H^+(z)} + \frac{G^-(z)}{H^-(z)}. \quad (26)$$

Observe from Equations (22) and (23) that time reversing a sequence of length $L$ has the following effect on the z-transform of the time-reversed sequence:

$$X_R(z) = z^{-L+1} X(z^{-1}) \quad (27)$$

where $X(z)$ is the z-transform of the original sequence and $X_R(z)$ is the z-transform of the time reversed sequence. Observe, also, that $H^-(z^{-1})$ has all of its zeros inside the unit circle. In other words, $G^-(z^{-1})/H^-(z^{-1})$ is a stable filter. Therefore, from FIG. 6, if we time-reverse the received signal block (of length $L+N$) on line 610, (using circuitry 620) which is corrupted due to $H(z)$, and process it with the stable filter 630 having the transfer characteristics $G^-(z^{-1})/H^-(z^{-1})$, we have the output on line 631 given by $$z^{-L-N+1} X(z^{-1}) H(z^{-1}) \frac{G^-(z^{-1})}{H^-(z^{-1})}. \quad (28)$$

which, when time reversed as a block of $L+N$ samples using circuitry 640, yields the following signal on line 641:

$$z^{-L-N+1}\left[z^{-L-N-1}X(z^{-1})H(z^{-1})\frac{G^-(z^{-1})}{H^-(z^{-1})}\right]_{z \leftarrow z^{-1}} = X(z)H(z)\frac{G^-(z)}{H^-(z)}. \quad (29)$$

By processing the received signal on line 610 with the stable filter $G^+(z)/H^+(z)$ using circuitry 650 and adding, using adder 660, the output signal on line 651 to the right hand side of equation (29), i.e., the signal on line 641, we obtain the desired signal on line 670, $$X(z)H(z)\left[\frac{G^+(z)}{H^-(z)} + \frac{G^-(z)}{H^-(z)}\right] = X(z). \quad (30)$$

Thus, with line-by-line processing, the IIR equalizer has the same performance (ghost suppression and noise enhancement) as the FIR equalizer, but requires fewer taps (142 versus 628 active taps).

The disadvantage of this technique, however, is that the factorization of the channel inverse into two separate polynomials can be complicated and time consuming. For example, consider the simple channel filter $a_1+z^{-1}+a_2z^{-2}$, which corresponds to one precursor and one postcursor ghost. Depending on the values of $a_1$ and $a_2$, we have the following possible situations for the locations of the zeros of this polynomial:

| $a_1$ | $a_2$ | location of zeros |
|---|---|---|
| 0.7 | 0.5 | both inside unit circle |
| 0.5 | 0.7 | both outside unit circle |
| 0.5 | 0.5 | both on unit circle |
| 0.4 | 0.4 | one inside, one outside unit circle |

As can be seen from this example, even with just two ghosts, the location of the zeros relative to the unit circle is not obvious. Thus, to factor the channel response into $H^+(z)$ and $H^-(z)$, we must find all the zeros of $H(z)$. Unfortunately, the factorization of a 142 degree polynomial is complicated and time consuming. Therefore, the adaptation time of the IIR equalizer will be longer than that of the FIR equalizer, although adaptation is still feasible.

As noted above, although each line contains only samples from the ghosted analog signal of that line, other (ghosted) signals in the horizontal flyback interval may have samples in two adjacent lines. Thus line-by-line processing in accordance with our invention may cause these signals to interfere with the deghosted analog signal. However, as long as signals during the horizontal flyback interval are deterministic signals, their shape and level without ghosting is known a priori. Since the channel response is also known, we can determine the sampled values for these signals and subtract them from the analog signal before equalization. Thus, for line-by-line processing to adequately equalize the received analog signal, the only requirement is a period without any nondeterministic signals between the lines, with the ghost duration less than this period.

Also as noted above, for line-by-line processing to work, the ghost delay must be less than 11.2 $\mu$sec (for NTSC). To accommodate the possibility of ghost delays as large as 24 $\mu$sec (corresponding to a path length difference of 7.2 km) or larger, conventional equalization techniques can be used to supplement our process. These techniques are usually adequate because ghosts with large delay tend to be weaker (since they are reflected from more distant objects). Specifically, from the channel model, we determine if any ghosts have a larger delay than 11.2 $\mu$sec. A conventional FIR or IIR equalizer is then used to suppress (to 40-50 dB below the main signal) only these ghosts before line-by-line processing. Thus, by preprocessing the received signal, these ghosts can be suppressed and line-by-line processing will work satisfactorily.

For large ghosts with large delays, we have devised the following solution. Since such ghosts are generated by large, distant objects, these reflectors will occupy only a small spatial angle from the point of view of the receiving antenna. In general, such ghosts can be reduced in magnitude by adjusting the receive antenna so that its pattern is very weak in the direction of the main reflections. Since the location of these large objects (such as buildings or mountains) usually would be fixed, only a one time adjustment would be required. Simple rabbit ears can be adjusted to suppress strong ghosts or, in more severe cases, adaptive antennas (i.e., an array of antennas) can be used to suppress the ghosts. Adaptive antennas can be used in combination with line-by-line processing, and even preprocessors using conventional FIR or IIR equalizers, to eliminate ghosts in all cases.

Figure 6:
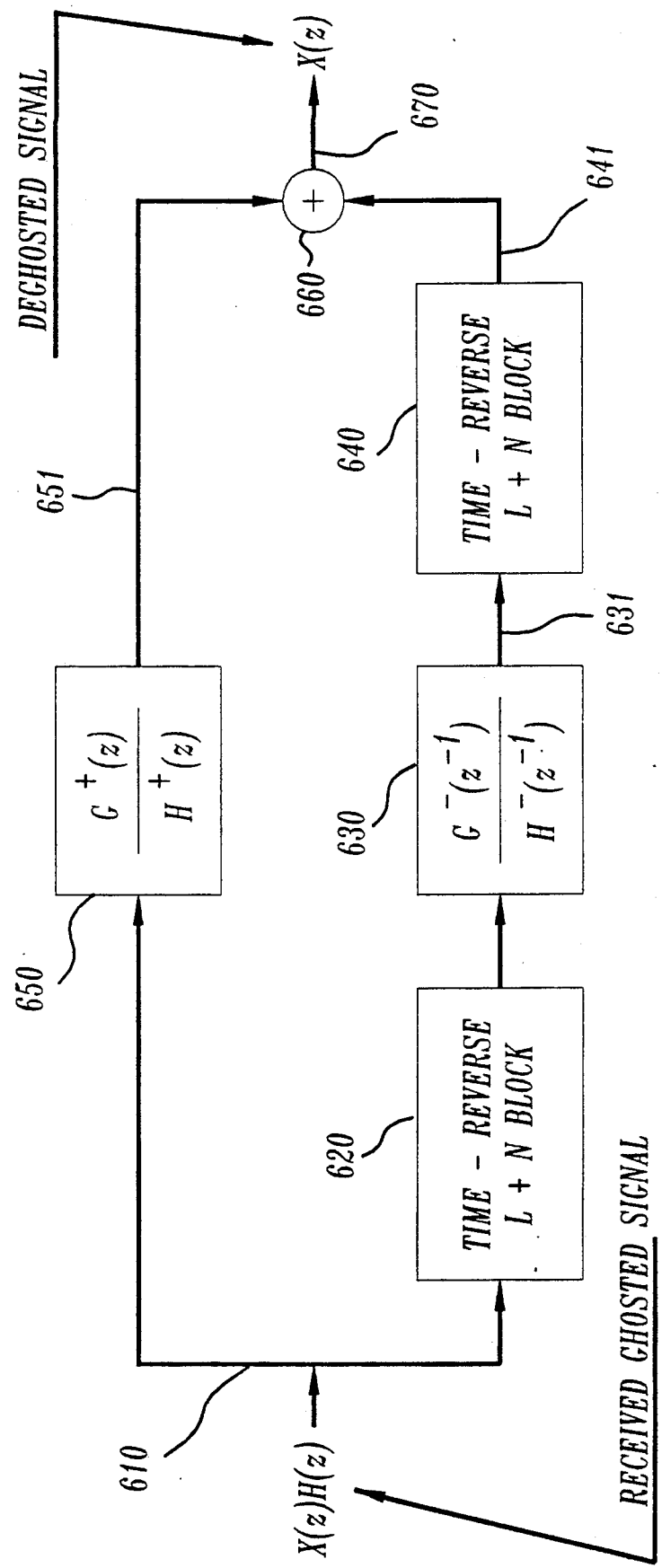
FIG. 6 is a block diagram of the IIR filter with unstable modes using time reversal.
Figure 7:
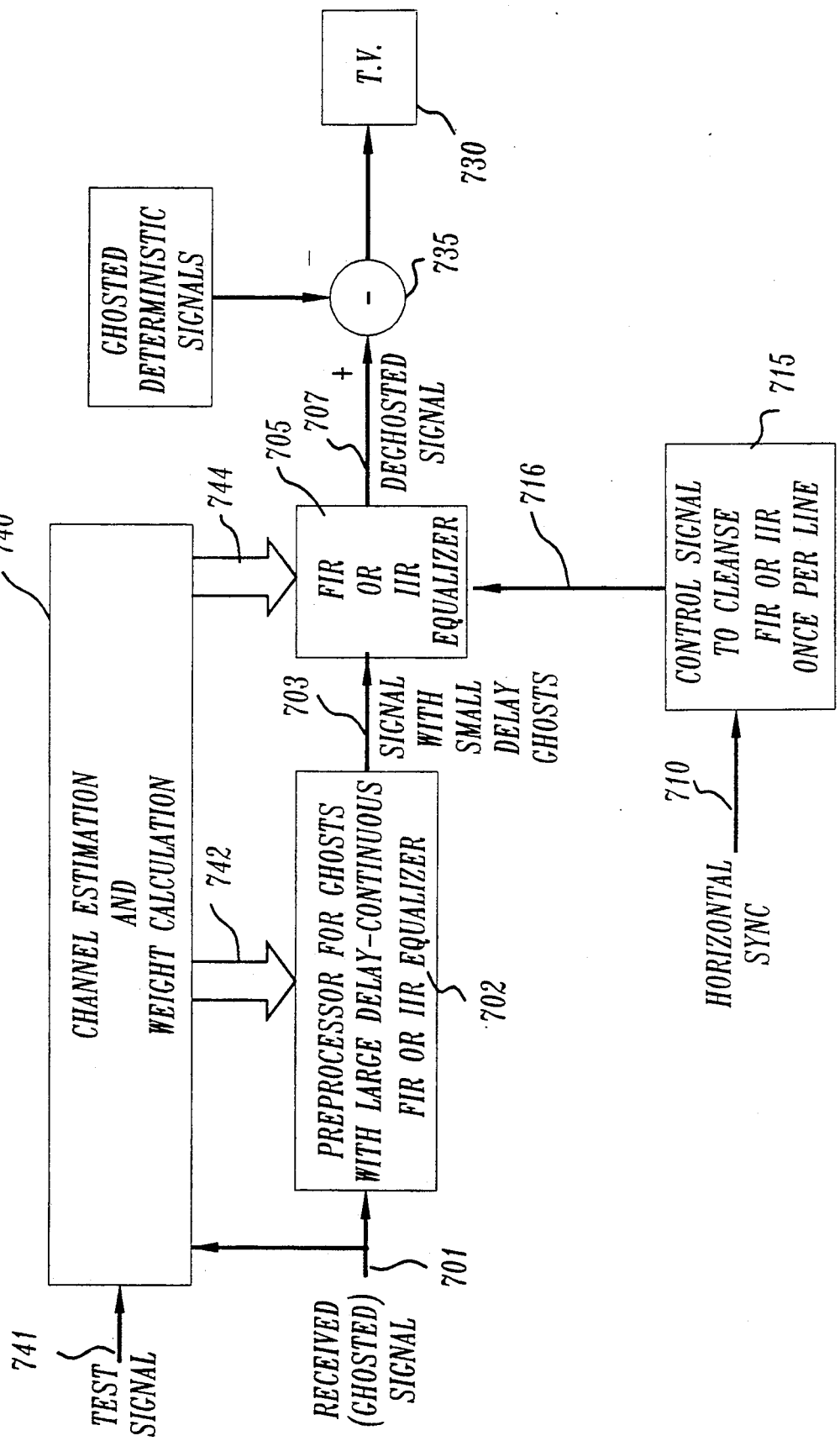
FIG. 7 is a block diagram of a ghost canceler in accordance with our invention.

FIG. 7 shows a block diagram of a ghost canceler arranged in accordance with our invention. The received (ghosted) signal on line 701 is (optionally) first pre-processed by a standard FIR or IIR equalizer 702 which reduces only distortion due to ghosts with large delays. These equalizers can be implemented as shown in FIGS. 2 or 3, except that there is no need to periodically "cleanse" these filters. If desired, the equalizer that performs preprocessing can be implemented on the same hardware and/or software (e.g., integrated circuits) as the line-by-line processing equalizer. The resulting output signal on line 703 then contains only distortion due to ghosts with small delays. This signal is then processed by an FIR or IIR equalizer 705, which may be implemented as shown in FIGS. 2 and 3, respectively, or, alternatively, for the IIR equalizer with time reversal, as shown in FIG. 6. Equalizer 705 is arranged so that its data is set to zero (i.e., the equalizer is cleansed) at some point (depending on the range of ghost delays) in the horizontal flyback period during each line. In FIG. 7, the horizontal sync signal on line 710 is used to generate a control signal that is applied to equalizer 705 via line 716 in order to initiate such cleansing, as by closing switches 260 or 360. The deghosted signal produced on line 707 is then sent to the TV 730 via a subtractor 735. The purpose of subtractor 735 is to permit any deterministic signals present in the deghosted signal to be removed from the output signal. This deterministic signal may be present during the inactive portion of each line (horizontal flyback interval). The FIR and IIR equalizer tap weights are determined in a channel estimation and weight calculation circuit 740, which may be arranged as shown in FIGS. 4 or 5. Circuit 740 receives the ghosted signal on line 701 and a test signal on line 741, and applies the appropriate tap weights (coefficients) to both equalizers 702 and 705 via paths 742 and 744, respectively.

Figure 8:
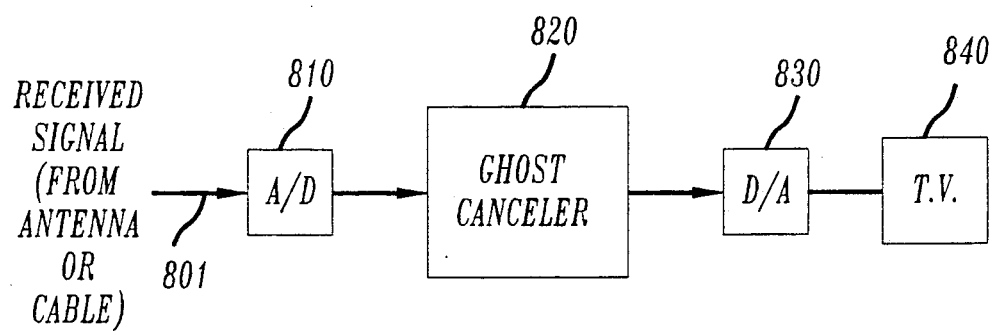
FIG. 8 is a block diagram of one implementation of our ghost canceler that can be connected to the input of a television receiver.

The ghost canceler of FIG. 7 can be used in conjunction with conventional NTSC receivers using the circuitry shown in FIG. 8. In that figure, an A/D converter 810, which contains required frequency translation circuitry to A/D convert any channel, receives the ghosted television signal on line 801 from an antenna or cable and applies the corresponding digital signal to canceler 820, which is implemented as shown in FIG. 7. The output of canceler 820 is then applied to D/A converter 830, which contains required frequency translation circuitry to return the deghosted signal to analog form compatible with television 840. For IDTV or EDTV, since digital signals are used within the TV, our techniques can be implemented by simply incorporating the appropriate circuitry directly in the TV without A/D and D/A converters.

For HDTV, the application and need for our invention depends on the HDTV format. Since most HDTV proposals use a mixture of digital and analog signals, our invention would be advantageous for deghosting the analog portion of the signal in all ghosting scenarios. In particular, if there are periods between the analog signals without nondeterministic signals, then line-by-line processing can be used. The allowable ghost delay depends on the length of these periods.

However, even when only digital signals are transmitted, our techniques may be useful. As an example, in one of the proposals that have been publicly discussed, only digital signals are transmitted. In this proposal, some of these signals are $(256)^2$ QAM signals, and the 16-bit symbols cannot always be determined with a low error probability. Since at high error rates DFE will not work, these digital signals cannot be deghosted by conventional equalization techniques. However, these QAM signals are transmitted as lines, with a short ($\approx 2$ μsec in one version of the proposal) synchronization sequence at the start of each line, and can be viewed as analog signals. Thus, line-by-line processing in accordance with this invention can be used to eliminate large ghosts with delays less than this sequence interval.

We now present three examples that illustrate the three advantages of line-by-line processing as contemplated by our invention, namely 1) elimination of the ghost suppression limitation of a conventional FIR equalizer, 2) reduction of the noise enhancement limitation of a conventional IIR equalizer, 3) usage of an IIR with zeros inside and outside the unit circle. These advantages can be demonstrated on a large TV (e.g., 25″) with moving images, where the picture degradation with S/N<40 dB and $(D/U)_{out}<40-50$ dB is noticeable. Since we sometimes desire to illustrate our invention using still photos of paper quality where the picture degradation isn't noticeable unless the S/N and $(D/U)_{out}$ are much lower (e.g., S/N<20 dB, $(D/U)_{out}<10$ dB), the noise and ghost levels used in the examples are much higher than would typically be present in TV receivers. However, all of the advantages also hold at lower noise and ghost levels.

First, consider a single ghost with $(D/U)_{in}=1$ dB and $\tau=5$ μsec. Thus, from equation (4), $$h(t) = \delta(t) + 0.8\,\delta(t - 5\ \mu\text{sec}). \tag{31}$$

For a conventional FIR equalizer with 628 taps, from equation (7), $$h_{FIR}(t) = \delta(t) + \sum_{i=1}^{10}(-0.8)^{-i}\delta(t - 5i\ \mu\text{sec}). \tag{32}$$

i.e., there are 11 active taps. The channel plus equalizer response is then, from equation (11), $$\begin{aligned}h(t)*h_{FIR}(t) &= \delta(t) + (-0.8)^{11}\delta(t - 55\ \mu\text{sec}), \\ &= \delta(t) + (-0.09)\delta(t - 55\ \mu\text{sec}).\end{aligned} \tag{33}$$

Therefore, after equalization, the ghost is at $\tau=55$ μsec with $(D/U)_{out}=11$ dB. Since the line length is 63.5 μsec, the ghost actually appears as a precursor ghost with $\tau=8.5$ μsec. With line-by-line processing, however, the ghost is completely suppressed.

Next, consider a single ghost with $(D/U)_{in}=0.18$ dB and $\tau=5$ μsec, and a received maximum S/N=20 dB (i.e., the signal power at saturation to noise power ratio). With a conventional IIR equalizer with 142 taps, the noise enhancement is, from equation (17), $$\frac{N_{out}}{N_{in}} = \frac{1}{1 - 0.96} = 25 \tag{34}$$

or the S/N in the equalizer output is 6 dB. With line-by-line processing, the noise enhancement is, from equation (17), that of an FIR equalizer, or, $$\frac{N_{out}}{N_{in}} = \frac{1 - (0.96)^{10}}{1 - 0.96} = 8.4 \tag{35}$$

or the worst S/N in the equalizer output is 11 dB. Note that the S/N decreases (the noise increases) across the line from 20 dB to 11 dB.

Finally, consider two ghosts with $(D/U)_{in}=8$ dB and $\tau=\pm 1.5$ μsec. Thus, $$h(t) = \delta(t) + 0.4\delta(t - 1.5\ \mu\text{sec}) + 0.4\delta(t + 1.5\ \mu\text{sec}). \tag{36}$$

and $$\begin{aligned}H(z) &= 0.4z^{30} + 1 + 0.4z^{-30} \\ &= 0.2(2 + z^{-30})(2 + z^{30}).\end{aligned} \tag{37}$$

and, therefore, half the poles are inside and half the poles are outside the unit circle. The deghosted image when line-by-line processing with time inversion is used to equalize the channel, shows very good results.

Various modifications and adaptations may be made to the present invention by those skilled in the art. For example, numerous software implementations of FIR and IIR equalizers are available, and may be used advantageously. In addition, while line-by-line processing of a television signal is usually preferred, it may sometimes be advantageous to group several lines together for processing independently of other groups. This could be accomplished, for example, by cleansing the equalizer once every several lines. Accordingly, it is intended that the invention be limited only by the following claims.

We claim:

1. Apparatus for removing ghosts that arise during transmission of a television signal over a transmission channel, said television signal including a plurality of active intervals separated by short inactive intervals during which there are no non-deterministic signals, said apparatus comprising means for applying said television signal to an equalizer having a transfer function that approximates the inverse frequency of said response transmission channel, and means for processing said television signal in said equalizer during each of said active intervals independently of the processing of said television signal for other ones of said active intervals.

2. The invention defined in claim 1 wherein said active intervals correspond to scan lines in said television signal and said inactive intervals correspond to the horizontal flyback interval between scan lines, and wherein said processing means includes means for periodically cleansing said equalizer once for each of said scan lines.

3. The invention defined in claim 1, wherein said apparatus includes means for periodically sampling said television signal, and said processing means is arranged to process blocks of samples, each of said blocks being associated with one pair of said active and inactive intervals.

4. The invention defined in claims 2 or 3 wherein said equalizer is a FIR or an IIR equalizer.

5. The invention defined in claim 2, wherein said periodic cleansing means is arranged to zero signals in said equalizer once for each of said scan lines.

6. The invention defined in claim 1 wherein said apparatus further includes a second equalizer arranged to remove ghosts with large delays.

7. The invention defined in claim 1 further including means for subtracting from said television signal any deterministic signals occurring during said inactive intervals.

8. A method of processing a television signal to remove ghosts that arise during transmission of said television signal over a transmission channel, said television signal including a plurality of active intervals separated by short inactive intervals during which there are no unknown signals, said method comprising the steps of applying said television signal to an equalizer having a transfer function that is the inverse frequency response of said transmission channel, and processing said television signal in said equalizer during each of said active intervals independently of the processing of said television signal for other ones of said active intervals.

9. The method defined in claim 8 wherein said active intervals correspond to scan lines in said television signal and said inactive intervals correspond to the horizontal flyback interval between scan lines, and wherein said processing step includes periodically cleansing samples processed in said equalizer once for each of said scan lines.

10. The method defined in claim 8, wherein said method includes periodically sampling said television signal, and said processing step includes processing blocks of samples, each of said blocks being associated with one of said active intervals.

11. The method defined in claims 9 or 10 wherein said equalizer is a FIR or an IIR equalizer.

12. The method defined in claim 9, wherein said periodic cleansing step includes zeroing said samples once for each of said scan lines.

13. The method defined in claim 8 further including the step of applying said television signal to a second equalizer arranged to remove ghosts with large delays.

14. The method defined in claim 8 further including the step of subtracting from said television signal any deterministic signals occurring during said inactive intervals.

15. A method of removing ghosts from a line-by-line television signal transmitted via a channel, comprising the steps of applying said television signal to an equalizer having a transfer function that inverts the frequency response of channel over which said television signal is transmitted, and processing said television signal on a line by line basis in said equalizer.

16. A method of processing a television signal transmitted over a channel to remove unwanted reflections including the steps of applying said television signal to a tapped delay line, adjusting the tap weights of said delay line to model the inverse frequency response of said channel, and periodically cleansing the television signals in said delay line.

17. The method of claim 16 wherein said cleansing step includes zeroing the contents of said delay line.

18. A method of reducing ghosts from a television signal received via a ghosted transmission channel, said television signal representing the characteristics of successive scan lines in a picture, comprising the steps of applying a portion of said television signal representing one of said scan lines to an equalizer which inverts the frequency response of said transmission channel, clearing said television signal portion from said equalizer, and repeating said applying step for other ones of said scan lines.

19. A method of removing ghosts from a received television signal transmitted over a transmission channel, comprising applying samples of said received television signal to a tapped delay line having a plurality of coefficients;

adapting said coefficients to equalize said transmission channel;

zeroing said samples in said delay line; and repeating said applying step with another portion of said received television signal.

20. A method of removing ghosts from a television signal received via a transmission channel, comprising the steps of applying samples of said television signal to an IIR or FIR equalizer comprising a delay line having a plurality of taps;

forming the sum of the products of said samples present at said taps and a plurality of equalizer coefficients;

adaptively updating said coefficients so that said sum represents the inverse of said transmission channel; and periodically zeroing the television signals in said delay line.

21. Apparatus for processing a television signal transmitted over a channel to remove unwanted reflections including a tapped delay line having a plurality of tap weights, means for adjusting said tap weights of said delay line to model the inverse frequency response of said channel, and means for periodically cleansing the television signals in said delay line.

22. Apparatus for removing ghosts from a television signal received via a transmission channel, comprising:

an IIR or FIR equalizer comprising a delay line having a plurality of taps;

means for forming the sum of the products of samples present at said taps and a plurality of equalizer coefficients;

means for adaptively updating said coefficients so that said sum represents the inverse frequency response of said transmission channel: and means for periodically zeroing the television signals in said delay line.

* * * * *

UNITED STATES PATENT AND TRADEMARK OFFICE
CERTIFICATE OF CORRECTION

PATENT NO. : 5,119,196
DATED : Jun. 2, 1992
INVENTOR(S) : Ender Ayanoglu, et al

It is certified that error appears in the above-indentified patent and that said Letters Patent is hereby corrected as shown below:

In claim 1, column 17, line 6, after "said", cancel "response".

In claim 1, column 17, line 6, after "frequency", please insert --response--.

In claim 15, column 18, line 13, between "of" and "channel", insert --said--.

Signed and Sealed this

Eighth Day of October, 1996

Attest:

BRUCE LEHMAN

Attesting Officer

Commissioner of Patents and Trademarks